C. J. ANDERSON.
SCREW SEAT.
APPLICATION FILED JAN. 25, 1909.
945,737.  Patented Jan. 11, 1910.
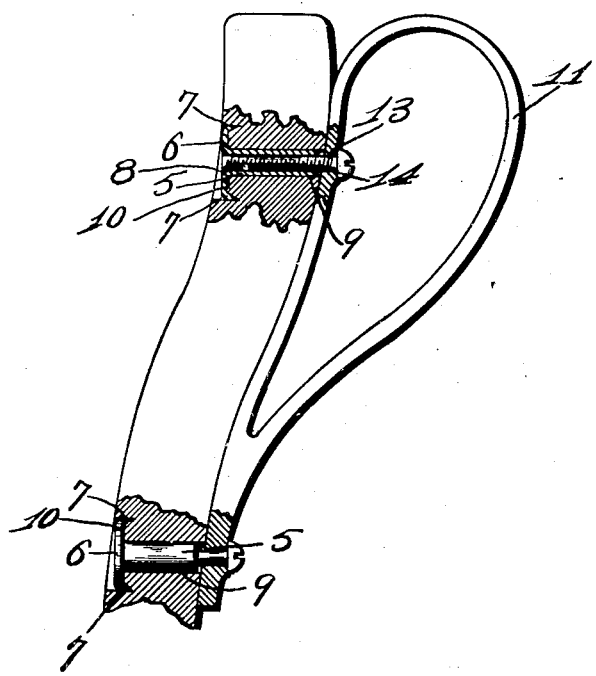
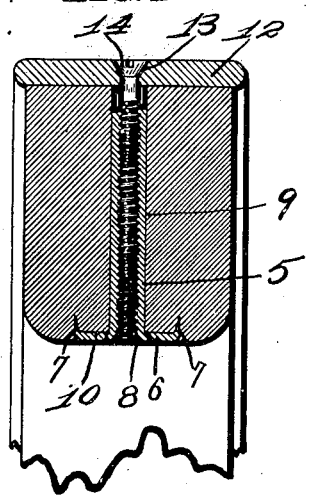
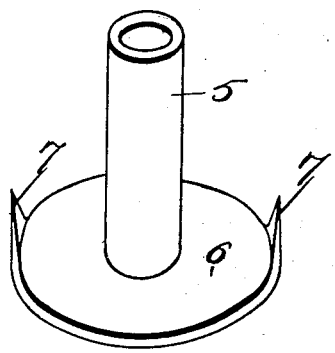
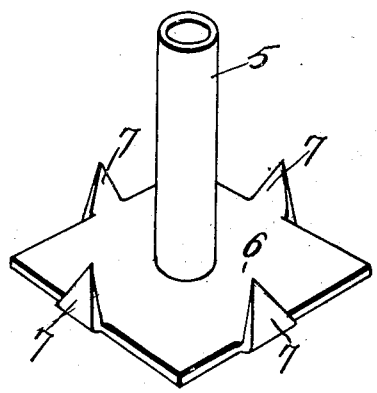
Witnesses
W. E. Stein
L. A. L. McIntyre
Inventor
Clarence J. Anderson
by Hopkins & Eicks Attys.

UNITED STATES PATENT OFFICE.

CLARENCE J. ANDERSON, OF ST. LOUIS, MISSOURI.

SCREW-SEAT.

945,737.

Specification of Letters Patent.  Patented Jan. 11, 1910.

Application filed January 25, 1909. Serial No. 474,335.

*To all whom it may concern:*

Be it known that I, CLARENCE J. ANDERSON, a citizen of the United States, and resident of St. Louis, Missouri, have invented certain new and useful Improvements in Screw-Seats, of which the following is a specification.

My invention relates to improvements in screw seats and has for its object to provide a screw seat capable of being seated through any desired thickness of wood or like material, and which, when seated, is secured against rotation, and is flush with the surface of the material wherein it is seated.

In the drawings—Figure 1 is a front plan view of an automobile seat-handle secured in place by two of the devices of my invention; the upper specimens being illustrated in section and the lower in plan view. Fig. 2 is a transverse vertical view in section of a felly and tire, illustrating the application of the device of my invention in such use; the felly and tire being shown in section and the device of my invention in transverse longitudinal mid-section. Fig. 3 is an enlarged perspective view of a device embodying my invention. Fig. 4 is a similar view of a modified form of my invention in which a square back-plate is employed instead of the circular back-plate illustrated in Fig. 3.

The screw seat of my invention comprises a cylindrical body member 5 and a back-plate 6 (preferably made integral with the body member 5), the back-plate 6 being provided with two or more inwardly projecting prongs 7. The body member 5 is tubular in construction and its interior is screw threaded throughout its length as illustrated in Figs. 1 and 2, being countersunk at its mouth as indicated by the numeral 8. The dimensions and form of the back-plate 6 may be varied with respect to the tensile strength of the material in which the screw seat is to be employed.

In mounting the screw seat in place, the structure in which it is to be seated is provided with the opening 9, which is circular in section, and the material is then countersunk from the back, as indicated by the numeral 10, to receive the thickness of the back-plate 6 so that when the screw seat is mounted in place the outer face of the back-plate 6 will not project beyond the face of the material, and will be flush with the face of said material when that face is substantially a plain surface as illustrated in Fig. 2. The opening being prepared for the reception of the screw seat, the screw seat is then slid into place and tapped with sufficient force to embed the prongs 7 in the material, thus securing the screw seat against rotation. The article which is to be mounted by means of the screw seat (illustrated as the automobile handle-seat 11 in Fig. 1 and the tire 12 in Fig. 2) is then seated in place so that its opening 13 admitting the screw 14 is in alinement with the bore of the body member 5. The screw 14 is then inserted into place, the screw being of such a length when seated in place that its point will project slightly beyond the plane of the outer surface of the back-plate 6. Thereupon the outer end of the screw may be struck with sufficient force as to fill the countersunk opening 8 with which the screw-seat is provided, thus riveting the screw in place as illustrated in Figs. 1 and 2.

As illustrated in Fig. 4, the back-plate 6 may be provided with any desired number of prongs 7 and may be indifferently circular, polygonal, or any desired form.

By the described means I have provided a screw seat which presents no protruding portion but is flush with the material in which it is embedded, and which is rendered incapable of rotation, and within which a screw may be riveted, thus securing against the accidental displacement or withdrawal of such screw.

Having fully described my invention, what I claim as new and desire to have secured to me by the grant of Letters Patent, is:

1. As a new article of manufacture, a screw seat comprising a tubular body section screw-threaded throughout its interior; a back-plate in which said tubular body member is rigidly seated; and one or more inwardly projecting prongs formed from and mounted upon the outer edges of said back-plate, substantially as described.

2. As a new article of manufacture, a screw seat comprising a tubular body section screw-threaded throughout its interior; a back-plate in which said tubular body member is rigidly seated; and one or more inwardly projecting prongs formed from and mounted upon the outer edges of said back-plate, the mouth of the tubular body member being flared, substantially as described.

In testimony whereof, I have signed my name to this specification, in presence of two subscribing witnesses.

CLARENCE J. ANDERSON.

Witnesses:
 Alfred A. Eicks,
 W. C. Stein.